US009257871B1

(12) United States Patent
Lu

(10) Patent No.: US 9,257,871 B1
(45) Date of Patent: Feb. 9, 2016

(54) TRANSFER SWITCH

(71) Applicant: KUTAI ELECTRONICS INDUSTRY CO., LTD., Kaohsiung (TW)

(72) Inventor: Wen-Feng Lu, Kaohsiung (TW)

(73) Assignee: Kutai Electronics Industry Co., Ltd., Kaohsiung (TW)

( * ) Notice: Subject to any disclaimer, the term of this patent is extended or adjusted under 35 U.S.C. 154(b) by 0 days.

(21) Appl. No.: 14/520,543

(22) Filed: Oct. 22, 2014

(51) Int. Cl.
*H01H 13/70* (2006.01)
*H02J 9/06* (2006.01)
*H01H 71/66* (2006.01)

(52) U.S. Cl.
CPC ................ *H02J 9/061* (2013.01); *H01H 71/66* (2013.01)

(58) Field of Classification Search
CPC ... H01H 25/041; H01H 13/70; H01H 25/008; H01H 2300/008; H01H 9/26
USPC .......... 200/5 R, 6 R, 9, 17 R, 18, 50.32–50.4, 200/330–332
See application file for complete search history.

(56) References Cited

U.S. PATENT DOCUMENTS

| | | | | |
|---|---|---|---|---|
| 4,855,543 A * | 8/1989 | Speer | B60Q 1/1469 200/17 R |
| 5,504,290 A * | 4/1996 | Baginski | H01H 71/70 200/330 |
| 2014/0166450 A1 * | 6/2014 | Buettner | H01H 3/02 200/17 R |

* cited by examiner

*Primary Examiner* — Edwin A. Leon
(74) *Attorney, Agent, or Firm* — Rosenberg, Klein & Lee

(57) ABSTRACT

A transfer switch has a mounting seat, and a main no-fuse circuit breaker, an auxiliary no-fuse circuit breaker, a switching control assembly, and a transmission mechanism mounted on the mounting seat. The switching control assembly selectively switches the main no-fuse circuit breaker and the auxiliary no-fuse circuit breaker. The transmission mechanism has a main transmission set and an auxiliary transmission set. When the switching control assembly is switched to form electrical conduction of the main no-fuse circuit breaker, the main transmission set drives the auxiliary transmission set via a transmission rod to prevent electrical conduction of the auxiliary no-fuse circuit breaker from forming. Likewise, when the electrical conduction of the auxiliary no-fuse circuit breaker is formed, the electrical conduction of the main no-fuse circuit breaker cannot be formed. Accordingly, safety of the transfer switch can be improved when switching between power sources.

10 Claims, 18 Drawing Sheets

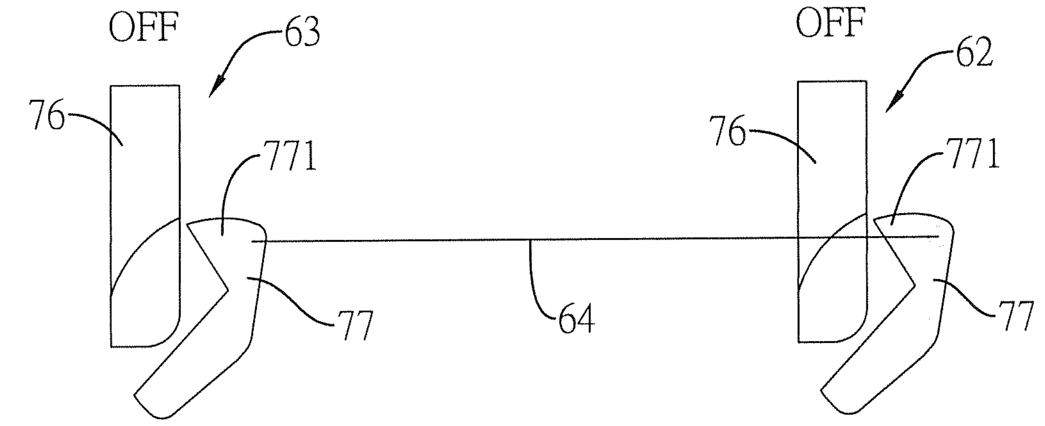
FIG.5
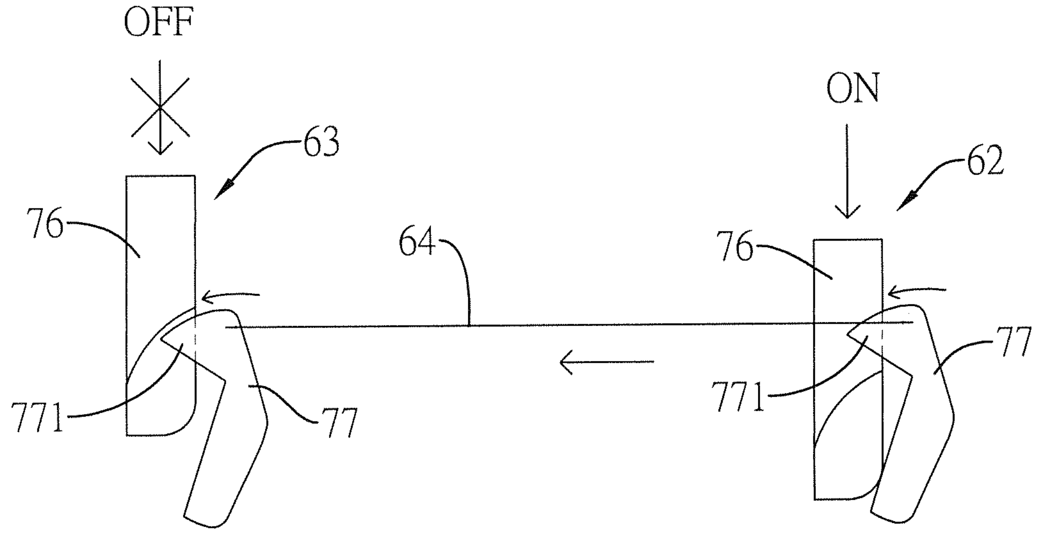
FOG.6

TRANSFER SWITCH

BACKGROUND OF THE INVENTION

1. Field of the Invention

The present invention relates to a transfer switch, especially to a transfer switch that has improved safety for use.

2. Description of the Prior Art(s)

A factory is electrically connected to a mains power source and an auxiliary power source. By switching a transfer switch, the mains power source and the auxiliary power source selectively provide electrical power to the factory.

A conventional transfer switch comprises a mounting seat, a main no-fuse circuit breaker, an auxiliary no-fuse breaker, a motor cover, and a switching control assembly. The main no-fuse circuit breaker, the auxiliary no-fuse breaker, and the motor cover are mounted on the mounting seat. The switching control assembly is mounted on the motor cover and has a gear set. The gear set has a motor gear, a main driven gear, and an auxiliary driven gear. The motor gear has a switching handle protruding out of the motor cover. The main driven gear and the auxiliary driven gear are oppositely disposed beside and engage with the motor gear. The main driven gear is disposed adjacent to the main no-fuse circuit breaker. A first transmission bar set is mounted between the main driven gear and the main no-fuse circuit breaker. The main driven gear has an eccentric lever protruding into and selectively driving the first transmission bar set. Thus, the first transmission bar set pushes a main switch handle of the main no-fuse circuit breaker. The auxiliary driven gear is disposed adjacent to the auxiliary no-fuse circuit breaker. A second transmission bar set is mounted between the auxiliary driven gear and the auxiliary no-fuse circuit breaker. The auxiliary driven gear has an eccentric lever protruding into and selectively driving the second transmission bar set. Thus, the second transmission bar set pushes an auxiliary switch handle of the auxiliary no-fuse circuit breaker.

When an operator turns the switching handle, circuits of the main no-fuse circuit breaker and the auxiliary no-fuse circuit breaker are "closed" to form electrical conductions or are "open" to interrupt the electrical conductions indirectly.

However, when the conventional transfer switch has problem in switching and causes the mains power source and the auxiliary power source to provide electrical power at the same time, a short circuit occurs and the factory facilities are damaged. Therefore, it is important to improve safety of using the conventional transfer switch.

To overcome the shortcomings, the present invention provides a transfer switch to mitigate or obviate the aforementioned problems.

SUMMARY OF THE INVENTION

The main objective of the present invention is to provide a transfer switch. The transfer switch has a mounting seat, a main no-fuse circuit breaker, an auxiliary no-fuse circuit breaker, a switching control assembly, and a transmission mechanism. The main no-fuse circuit breaker and the auxiliary no-fuse circuit breaker are mounted on the mounting seat. The switching control assembly is mounted on the mounting seat, and selectively switches the main no-fuse circuit breaker and the auxiliary no-fuse circuit breaker. The transmission mechanism is mounted on a bottom of the mounting seat and has a main transmission set and an auxiliary transmission set.

When the switching control assembly is switched to form electrical conduction of the main no-fuse circuit breaker, the main transmission set drives the auxiliary transmission set via a transmission rod to prevent electrical conduction of the auxiliary no-fuse circuit breaker from forming. Likewise, when the electrical conduction of the auxiliary no-fuse circuit breaker is formed, the electrical conduction of the main no-fuse circuit breaker cannot be formed. Accordingly, safety of the transfer switch can be improved when switching between power sources.

Other objectives, advantages and novel features of the invention will become more apparent from the following detailed description when taken in conjunction with the accompanying drawings.

BRIEF DESCRIPTION OF THE DRAWINGS

FIG. 5 is a schematic view of the transmission mechanism in FIG. 3;

FIG. 6 is an operational schematic view of the transmission mechanism in FIG. 3 when a main no-fuse circuit breaker is closed;

DETAILED DESCRIPTION OF THE PREFERRED EMBODIMENTS

Figure 1:
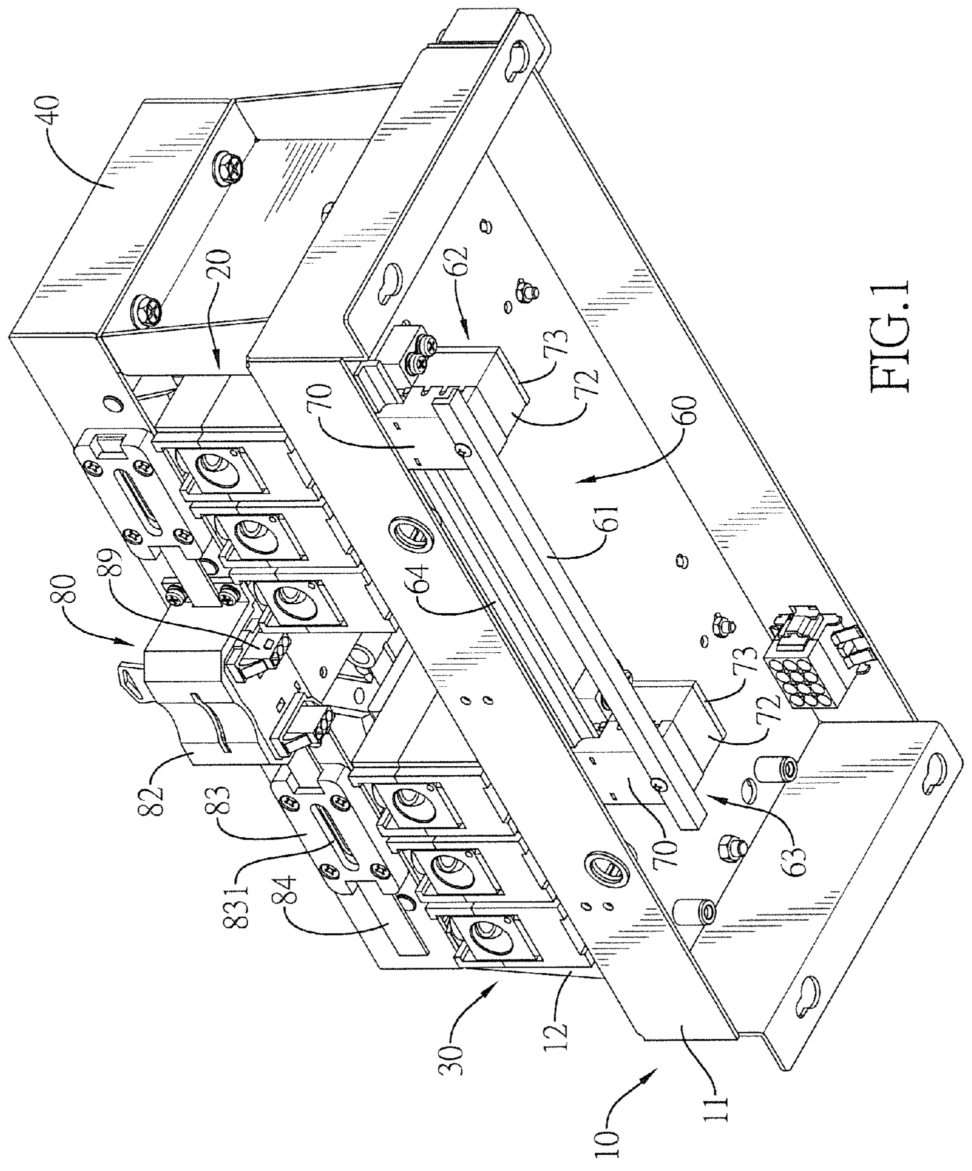
FIG. 1 is a perspective view of a transfer switch in accordance with the present invention.
Figure 2:
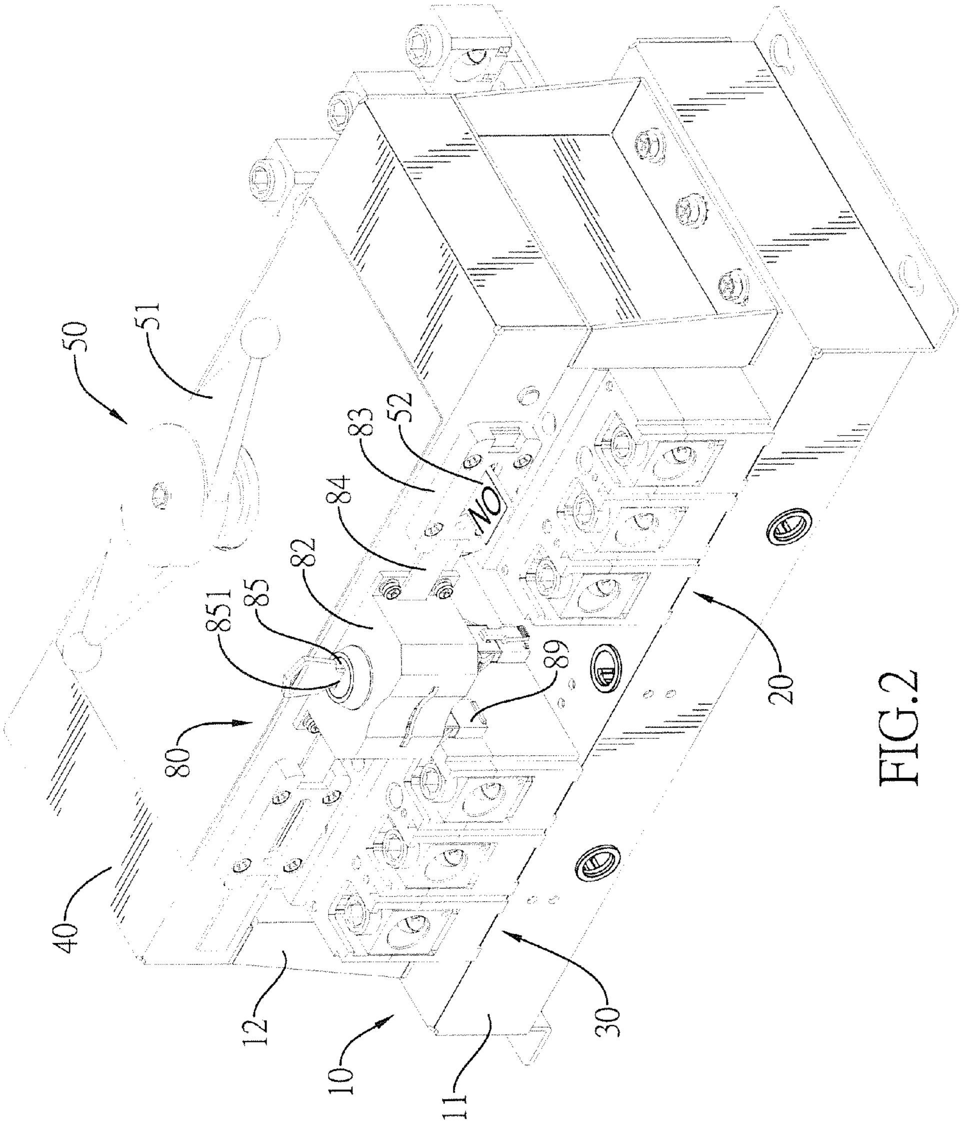
FIG. 2 is another perspective view of the transfer switch in FIG. 1.

With reference to FIGS. 1 and 2, a transfer switch in accordance with the present invention comprises a mounting seat 10, a main no-fuse circuit breaker 20, an auxiliary no-fuse circuit breaker 30, a motor cover 40, a switching control assembly 50, a transmission mechanism 60 for improving safety of switching the transfer switch, and a lock mechanism 80.

The mounting seat 10 has a base 11 and two side supports 12. The side supports 12 are separately mounted on the base 11.

Figure 12:
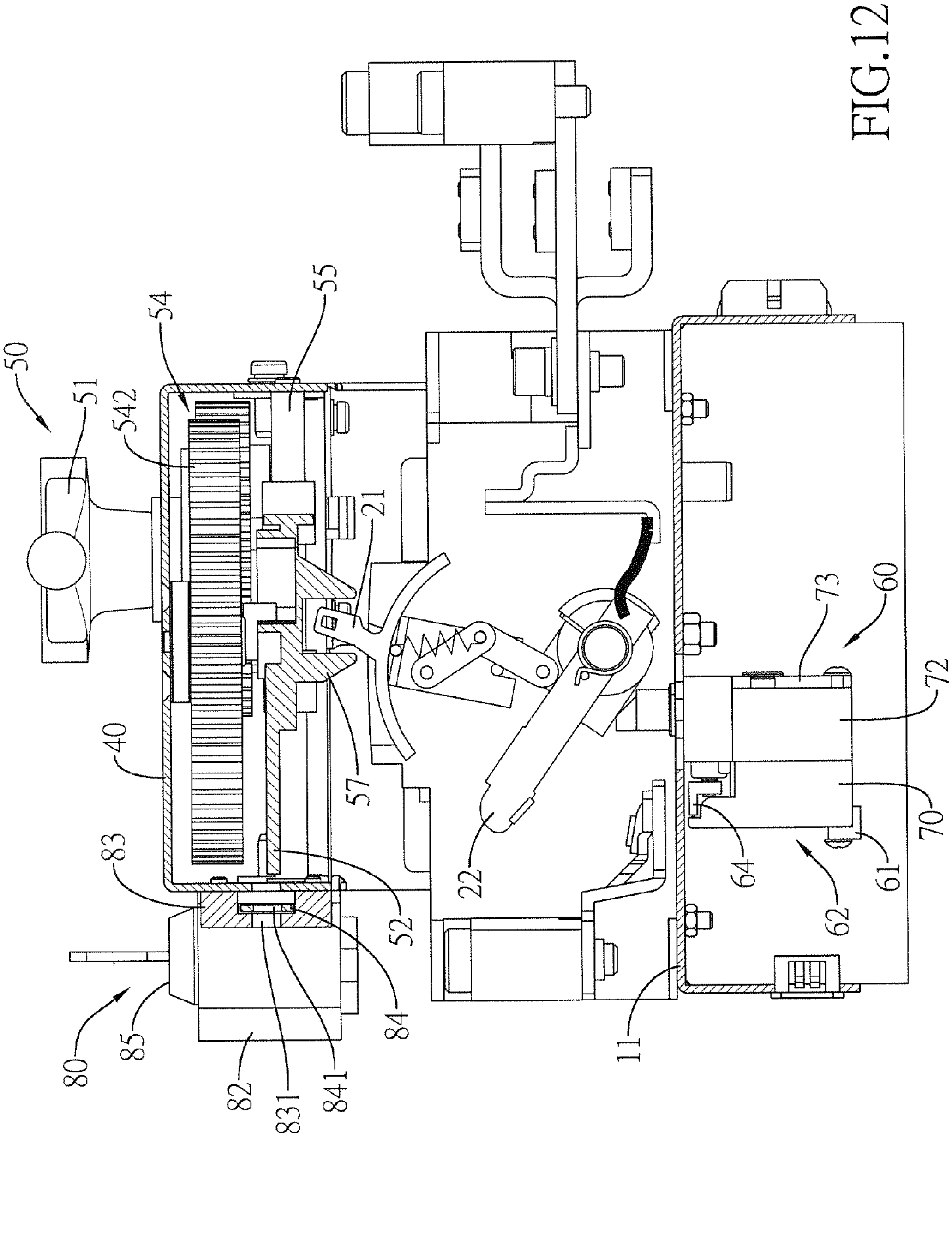
FIG. 12 is a side view in partial section of the transfer switch in FIG. 1, showing the electrical conduction of the main no-fuse circuit breaker is open.

With further reference to FIG. 12, the main no-fuse circuit breaker 20 is mounted on the base 11 of the mounting seat 10, is disposed between the side supports 12, and has a main switch handle 21 and a main moving element 22. The main moving element 22 is driven by the main switch handle 21.

Figure 22:
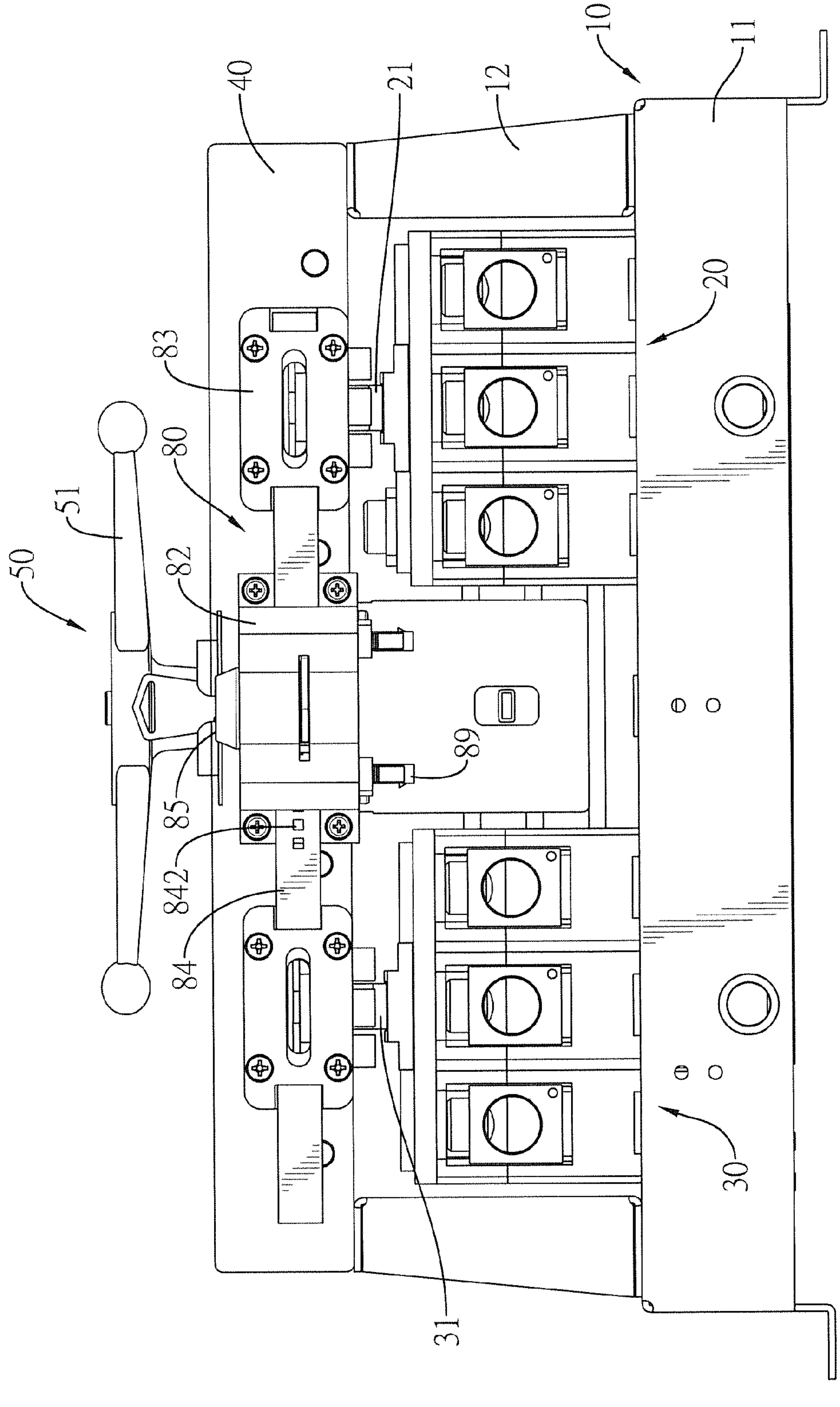
FIG. 22 is a front view of the transfer switch in FIG. 1, showing the lock mechanism is unlocked.
Figure 23:
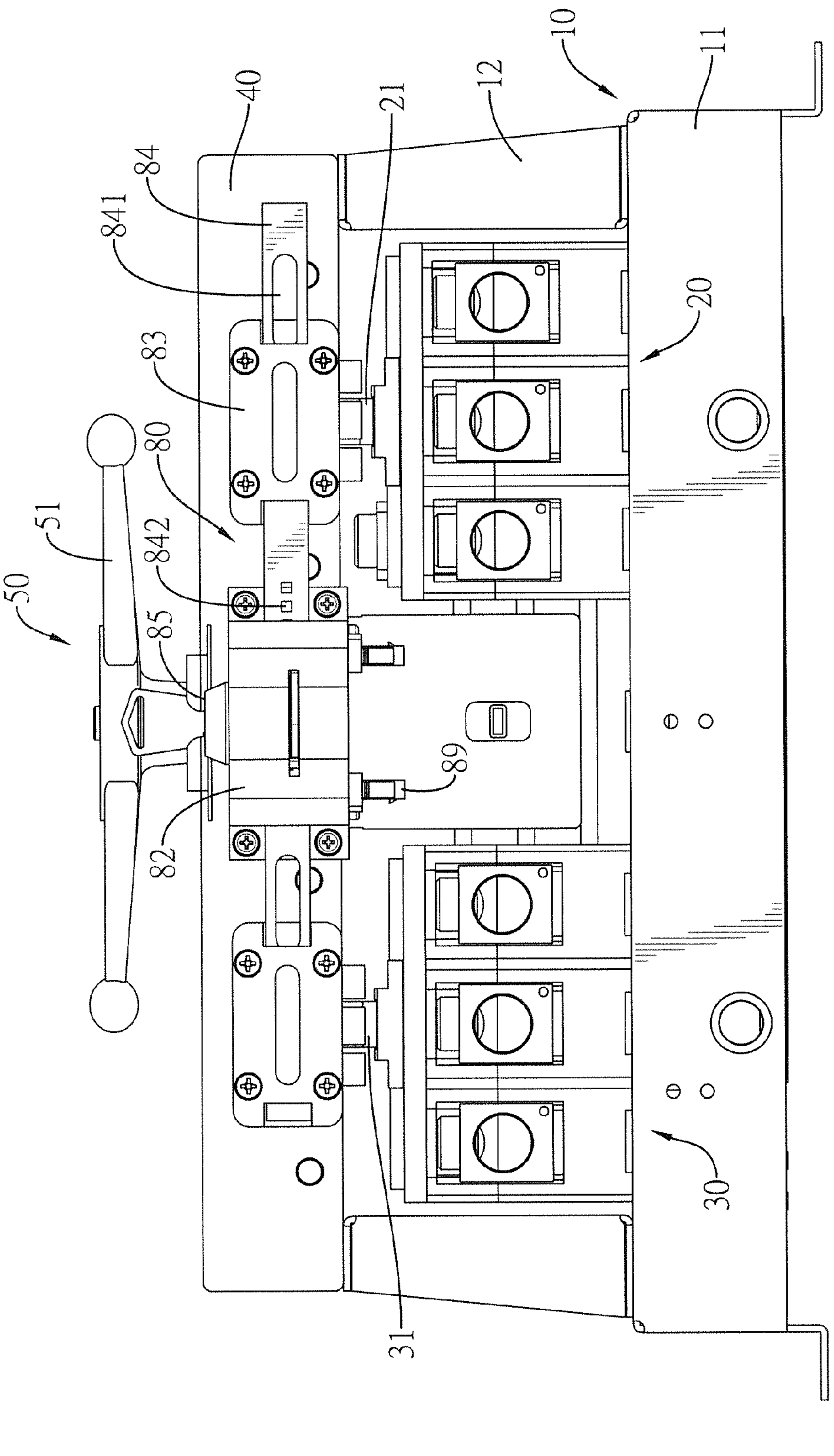
FIG. 23 is a front view of the transfer switch in FIG. 1, showing the lock mechanism is locked.

With further reference to FIG. 22, the auxiliary no-fuse circuit breaker 30 is mounted on the base 11 of the mounting seat 10, is disposed between the side supports 12, and has an auxiliary power switch handle 31 and an auxiliary moving element. The auxiliary moving element is driven by the auxiliary power switch handle 31.

The motor cover 40 is mounted on the side supports 12 and above the main no-fuse circuit breaker 20 and the auxiliary no-fuse circuit breaker 30.

Figure 13:
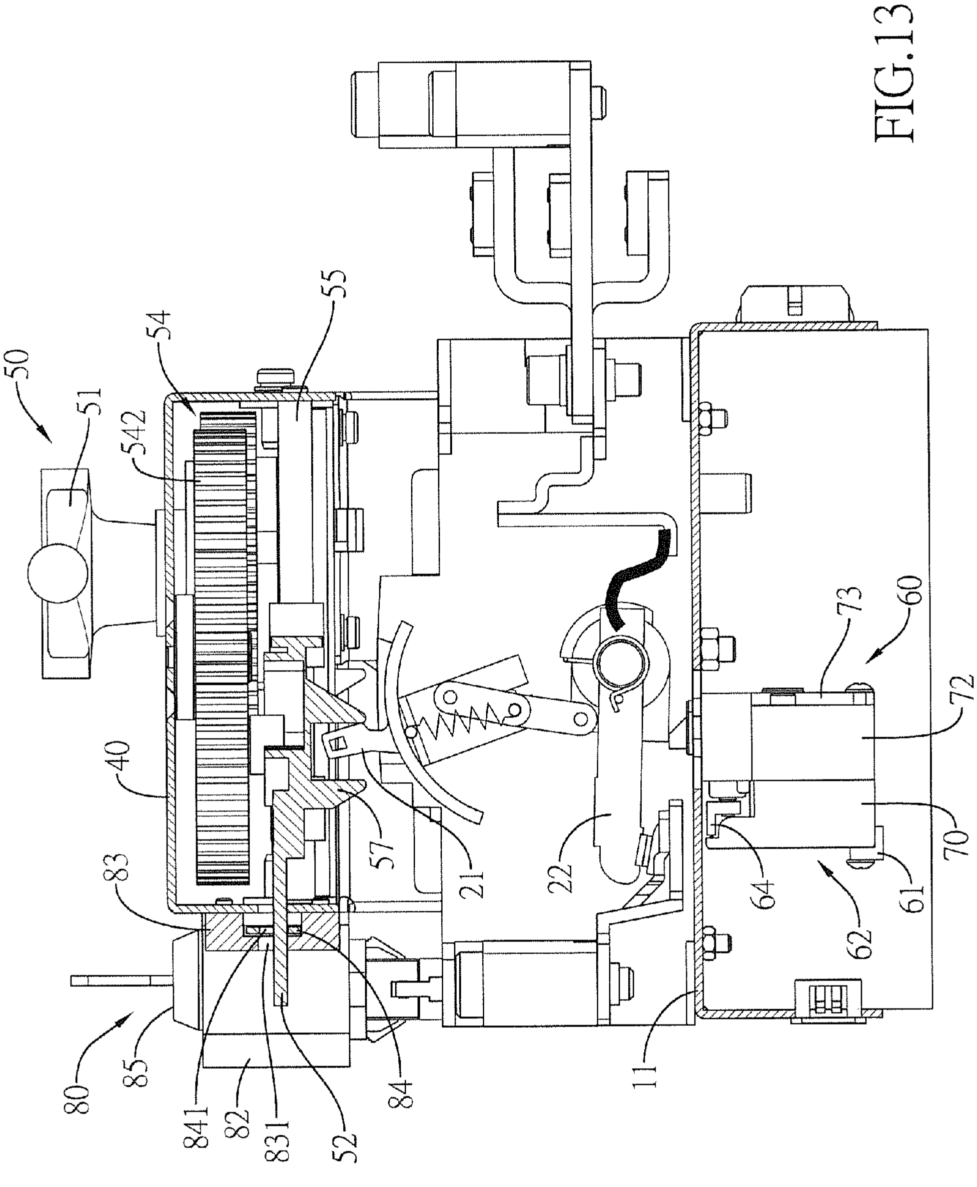
FIG. 13 is a side view in partial section of the transfer switch in FIG. 1, showing the electrical conduction of the main no-fuse circuit breaker is closed.

With reference to FIGS. 12 and 13, the switching control assembly 50 is mounted on the motor cover 40, is connected to the main switch handle 21 of the main no-fuse circuit breaker 20 and the auxiliary power switch handle of the auxiliary no-fuse circuit breaker 30, and selectively switches the main no-fuse circuit breaker 20 and the auxiliary no-fuse circuit breaker 30. The switching control assembly 50 has a switching handle 51, a main input indication plate 52, an auxiliary input indication plate, a gear set 54, a main function slider 57, and an auxiliary function slider.

The switching handle 51 is mounted on the motor cover 40. The main input indication plate 52 is slidably mounted in and selectively protrudes out of the motor cover 40, and corresponds in position to the main no-fuse circuit breaker 20. The auxiliary input indication plate is slidably mounted in and selectively protrudes out of the motor cover 40, and corresponds in position to the auxiliary no-fuse circuit breaker 30.

The gear set 54 is connected to the switching handle 51. The main function slider 57 is attached to the main input indication plate 52, is mounted above the main no-fuse circuit breaker 20, and is driven by the gear set 54 to selectively drive the main switch handle 21. The auxiliary function slider is attached to the auxiliary input indication plate, is mounted above the auxiliary no-fuse circuit breaker 30, and is driven by the gear set 54 to selectively drive the auxiliary power switch handle 31.

With further reference to FIGS. 3, 4, 9, and 10, the transmission mechanism 60 is mounted on a bottom of the base 11 of the mounting seat 10 and has a main transmission set 62, an auxiliary transmission set 63, a link rod 61, and a transmission rod 64.

As shown in FIG. 12, the main transmission set 62 corresponds in position to the main moving element 22. The auxiliary transmission set 63 is disposed apart from the main transmission set 62 and corresponds in position to the auxiliary moving element. The link rod 61 is securely connected to the main transmission set 62 and the auxiliary transmission set 63. The transmission rod 64 is connected to and is slidable relative to the main transmission set 62 and the auxiliary transmission set 63.

With further reference to FIG. 5, each of the main transmission set 62 and the auxiliary transmission set 63 has a rotating element 77 and a transmission bar 76. The transmission bar 76 is driven by a corresponding one of the main moving element 22 and the auxiliary moving element, selectively slides up and down, and drives the rotating element 77 to rotate. The transmission rod 64 has two ends respectively connected to the rotating elements 77 of the main transmission set 62 and the auxiliary transmission set 63.

Figure 3:
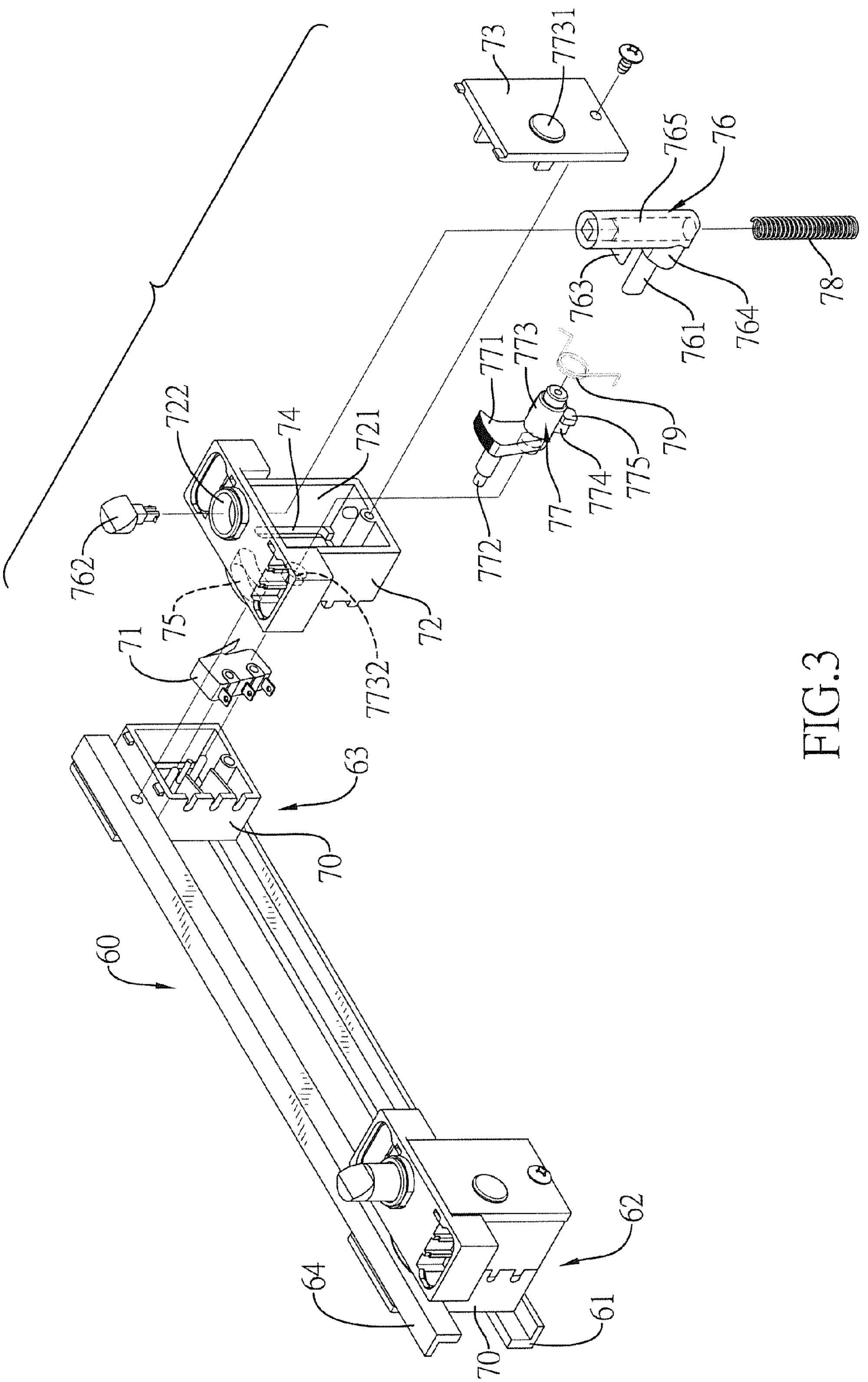
FIG. 3 is a partially exploded perspective view of a transmission mechanism of the transfer switch in FIG. 1.
Figure 4:
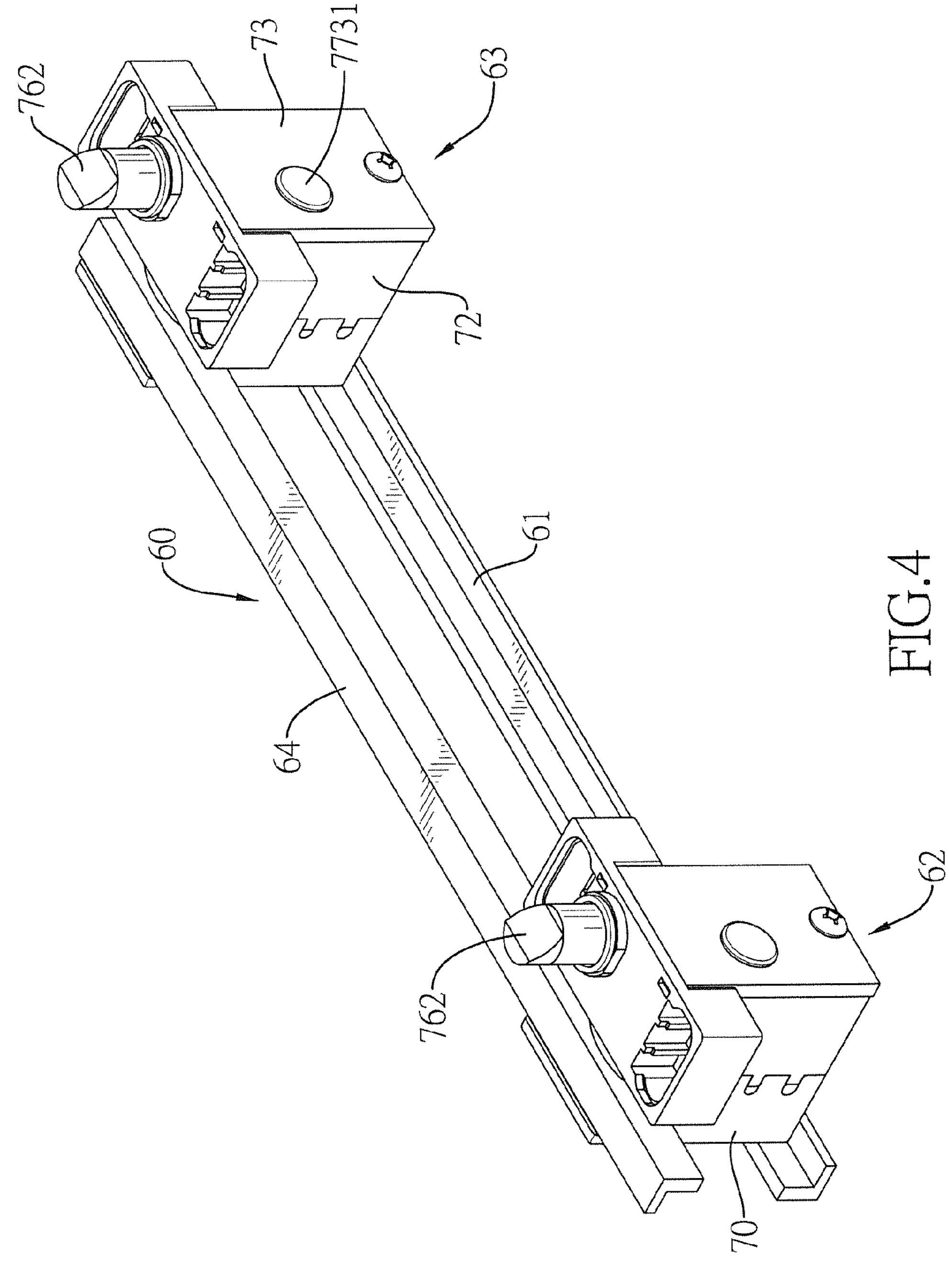
FIG. 4 is a perspective view of the transmission mechanism in FIG. 3.

As shown in FIG. 3, specifically, each of the main transmission set 62 and the auxiliary transmission set 63 has a micro switch case 70, a housing, the transmission bar 76, a first resilient element 78, the rotating element 77, and a second resilient element 79.

The micro switch case 70 is securely connected to the link rod 61 and receives a micro switch 71.

The housing is attached to the micro switch case 70 and has a through hole 722, two pivot holes 7731, 7732, a transverse slot 75, and a longitudinal slot 74. The through hole 722 of the housing is formed through an upper wall of the housing. The pivot holes 7731, 7732 are respectively formed through a front wall and a rear wall of the housing, and align with each other. The transverse slot 75 and the longitudinal slot 74 are formed through the front wall of the housing. The transmission bar 76 is mounted in the housing and has a main bar 765, a pushing protrusion 764, a stop protrusion 763, a sliding shaft 761, and an end cap 762. The main bar 765 has an upper end protruding through the through hole 722 of the housing. The pushing protrusion 764 protrudes from a side surface of the main bar 765. The stop protrusion 763 of the transmission bar 76 protrudes from the side surface of the main bar 765 and is disposed above the pushing protrusion 764. The sliding shaft 761 protrudes from the pushing protrusion 764, is mounted through the longitudinal slot 74 of the housing, protrudes into the micro switch case 70, and selectively triggers the micro switch 71 in the micro switch case 70. The end cap 762 is mounted on the upper end of the main bar 765, protrudes out of the housing, and is selectively pushed by the corresponding one of the main moving element 22 and the auxiliary moving element.

The first resilient element 78 is mounted in the housing and has two ends respectively abutting a lower end of the main bar 765 of the transmission bar 76 and a lower wall of the housing, such that the transmission bar 76 tends to slide upwardly and to protrude out of the housing. Preferably, the first resilient element 78 is a compression spring.

The rotating element 77 is mounted in the housing and has a pivot shaft 773, an engaging protrusion 771, a guiding shaft 772, a transmission protrusion 774, and a stop protrusion 775. The pivot shaft 773 has two ends respectively mounted pivotally in the pivot holes 7731, 7732 of the housing. The engaging protrusion 771 protrudes up from the pivot shaft 773 and selectively abuts a lower end of the stop protrusion 763 of the transmission bar 76. The guiding shaft 772 protrudes from the engaging protrusion 771, is mounted through the transverse slot 75 of the housing, and is connected to the transmission rod 64. The transmission protrusion 774 protrudes down from the pivot shaft 773, and is disposed below and is selectively pushed by the pushing protrusion 764 of the transmission bar 76. The stop protrusion 775 of the rotating element 77 protrudes from the transmission protrusion 774.

The second resilient element 79 is mounted in the housing and has two ends respectively abutting the stop protrusion 775 of the rotating element 77 and a side wall of the housing, such that the rotating element 77 tends to pivot to allow the engaging protrusion 771 to depart from the stop protrusion 763 of the transmission bar 76 and to allow the transmission protrusion 774 to be disposed below the pushing protrusion 764 of the transmission bar 76. Preferably, the second resilient element 79 is a torsion spring mounted around the pivot shaft 773 of the rotating element 77.

Specifically, the housing of each of the main transmission set 62 and the auxiliary transmission set 63 is formed by attaching a main case 72 and a side cover 73. The main case 72 has a front sidewall, a rear opening, and a mounting chamber 721. The front sidewall of the main case 72 faces the micro switch case 70. The rear opening of the main case 72 is covered with the side cover 73. The mounting chamber 721 is formed in the main case 72.

The through hole 722 of the housing is formed through an upper sidewall of the main case 72. The pivot holes 7731, 7732 of the housing are respectively formed through the front sidewall of the main case 72 and the side cover 73. The transverse slot 75 and the longitudinal slot 74 of the housing are formed through the front sidewall of the main case 72. The transmission bar 76 and the rotating element 77 of each of the main transmission set 62 and the auxiliary transmission set 63 are mounted in the mounting chamber 721 of the main case 72.

Figure 14:
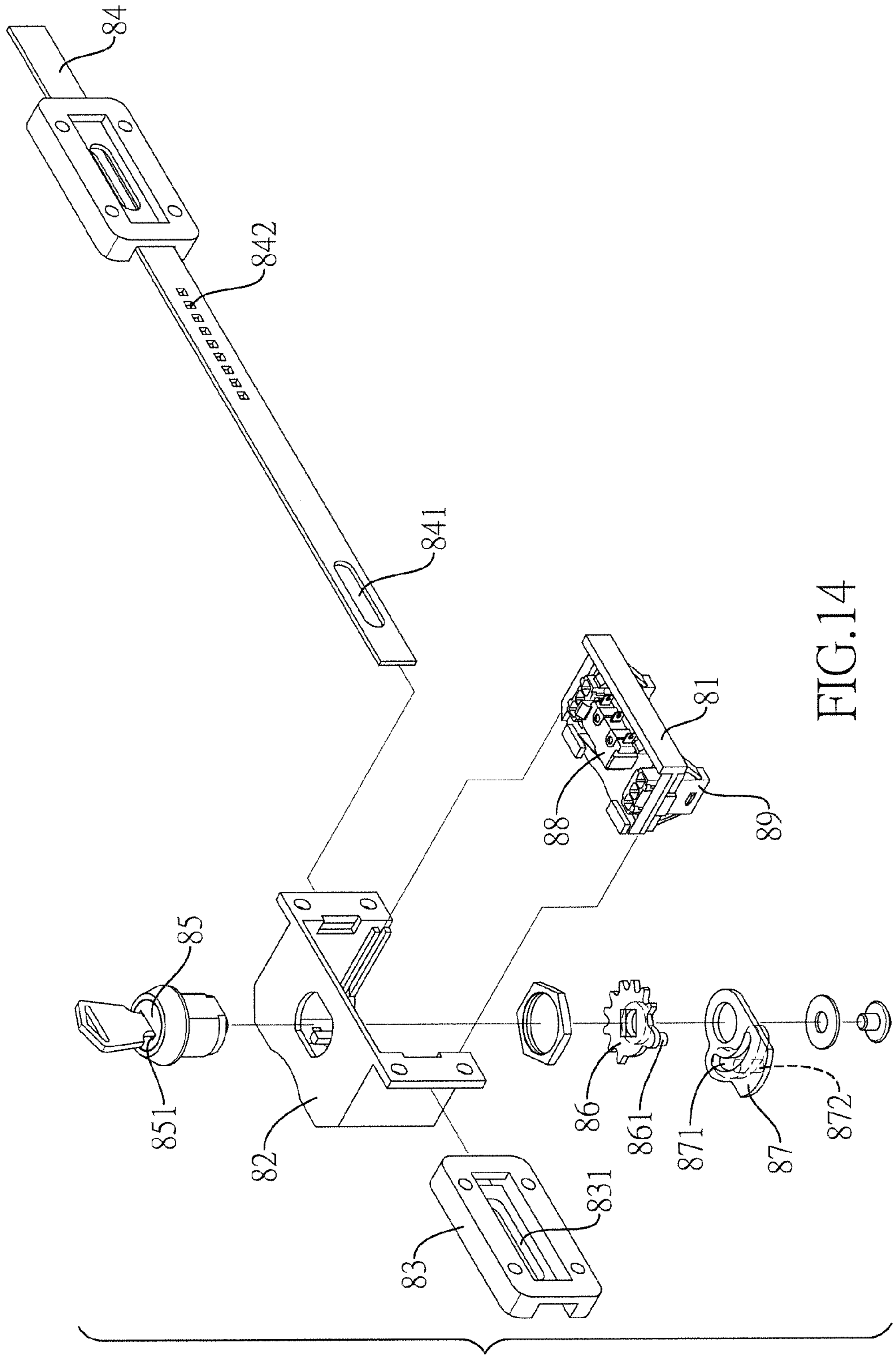
FIG. 14 is an exploded perspective view of a lock mechanism of the transfer switch in FIG. 1.
Figure 15:
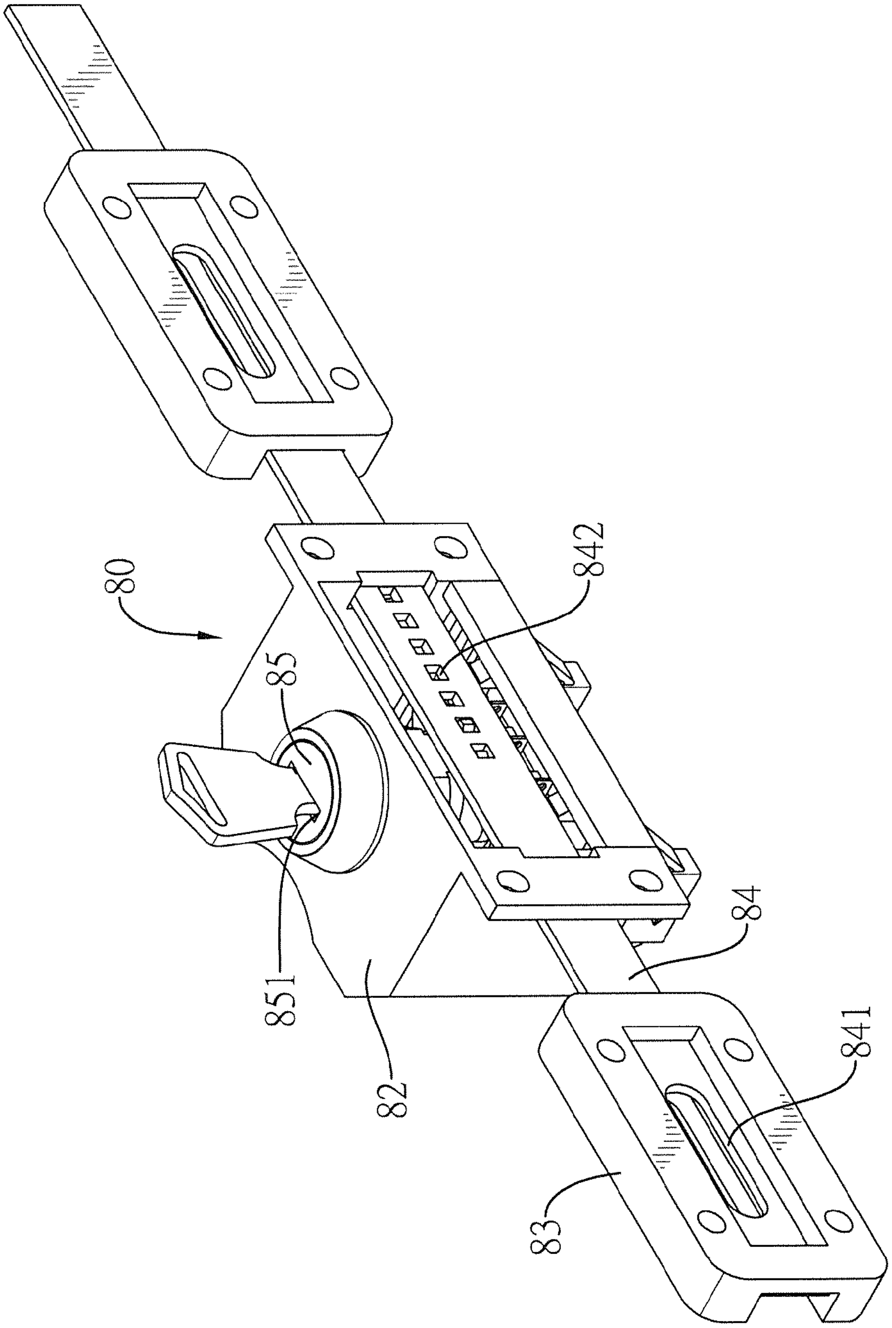
FIG. 15 is a perspective view of the lock mechanism in FIG. 14.
Figure 16:
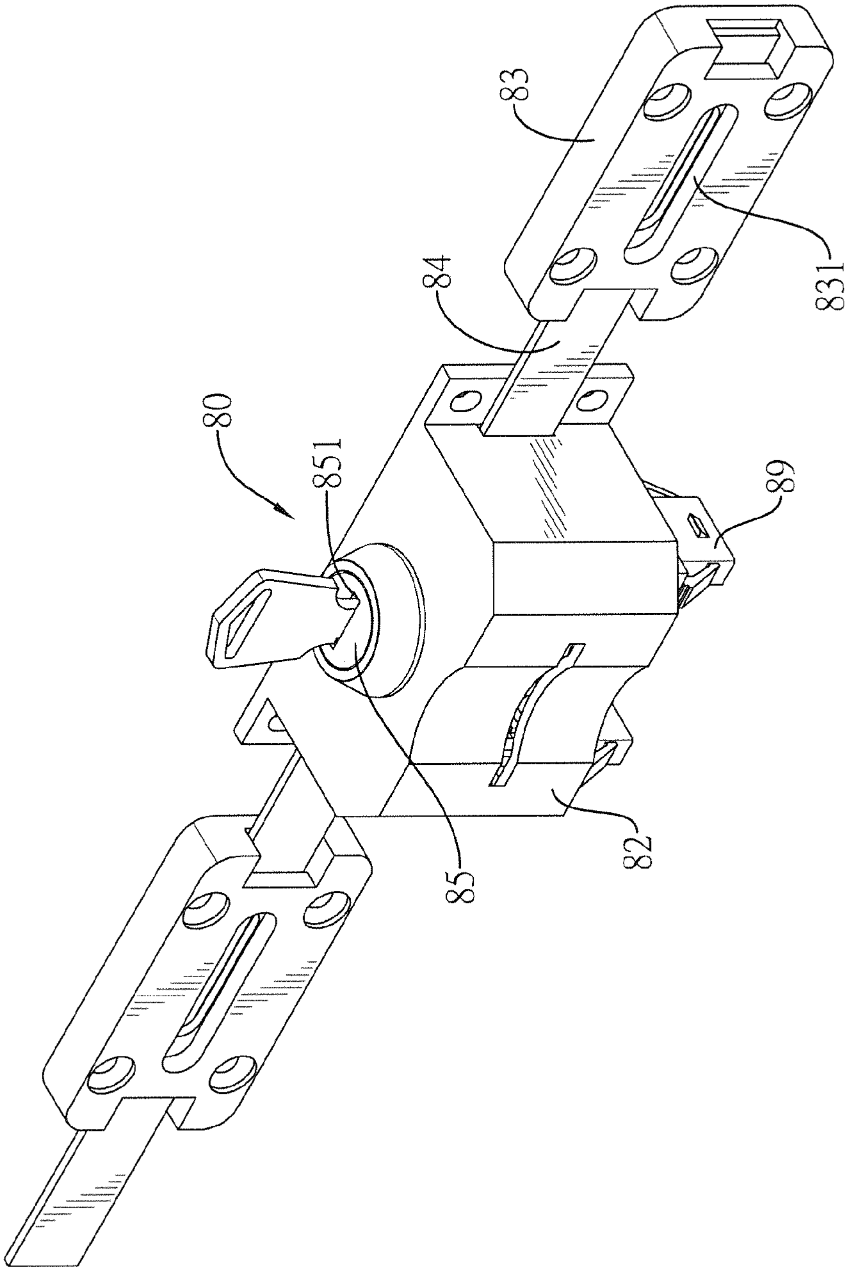
FIG. 16 is another perspective view of the lock mechanism in FIG. 14.
Figure 17:
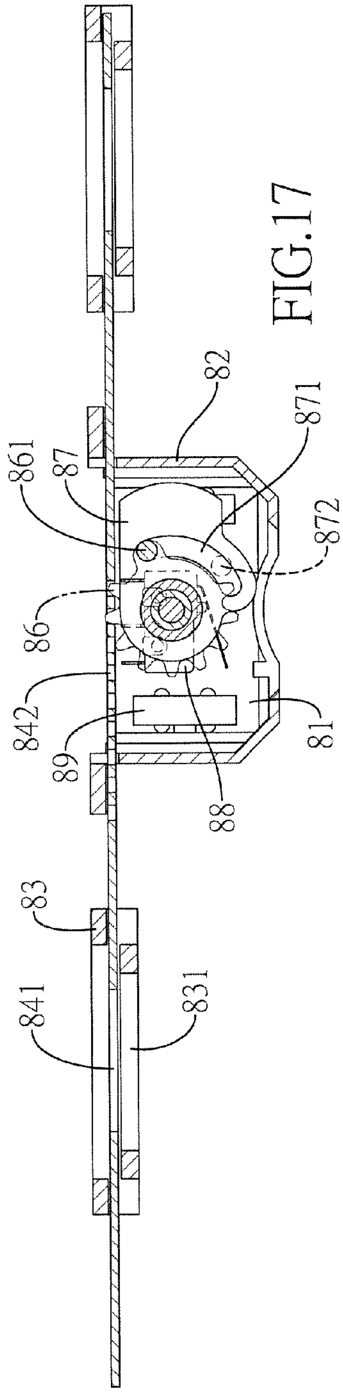
FIG. 17 is a cross-sectional top view of the lock mechanism in FIG. 14, showing the lock mechanism is unlocked.
Figure 18:
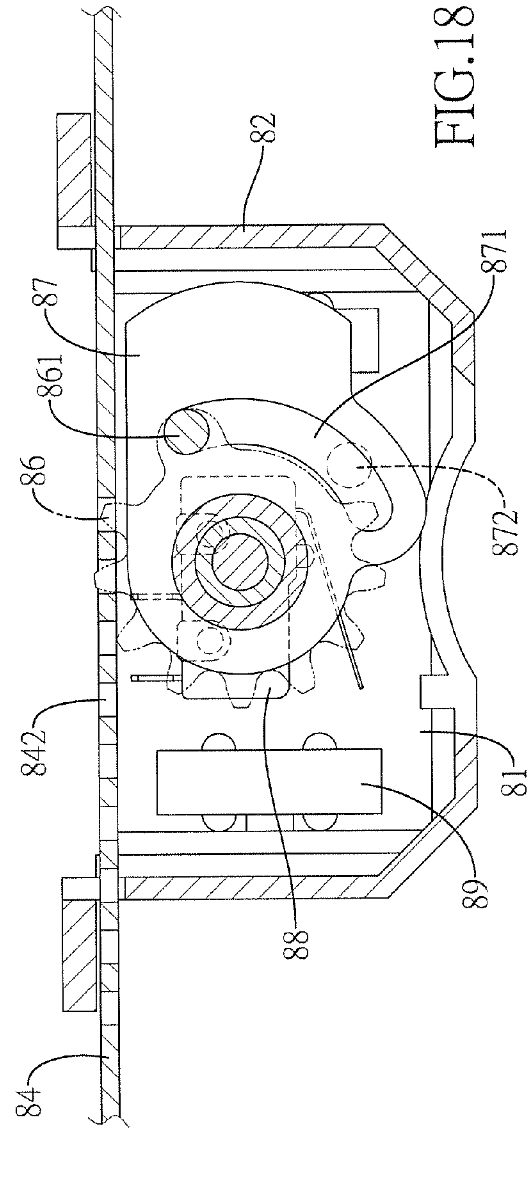
FIG. 18 is an enlarged cross-sectional top view of the lock mechanism in FIG. 14, showing the lock mechanism is unlocked.
Figure 19:
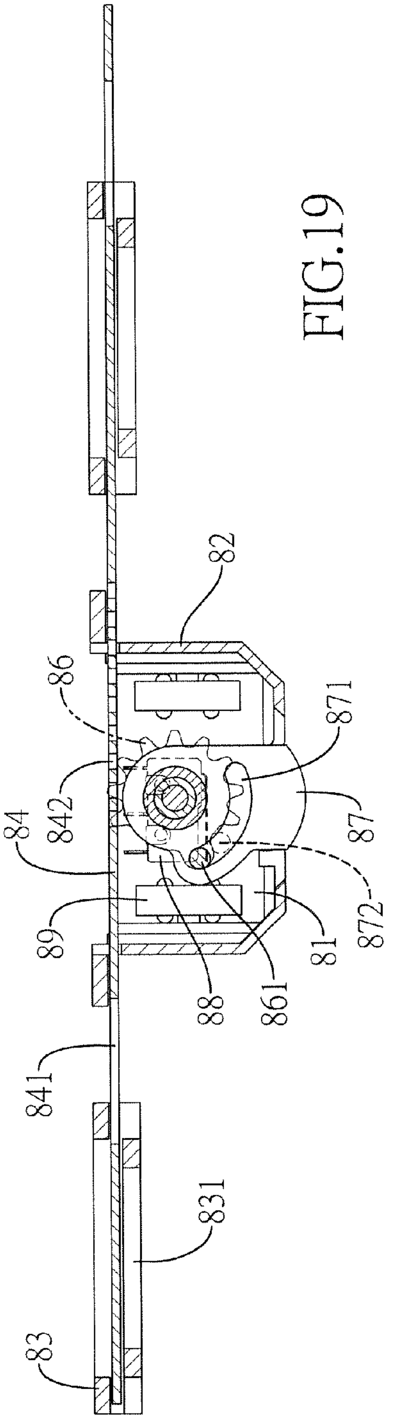
FIG. 19 is a cross-sectional top view of the lock mechanism in FIG. 14, showing the lock mechanism is locked.
Figure 20:
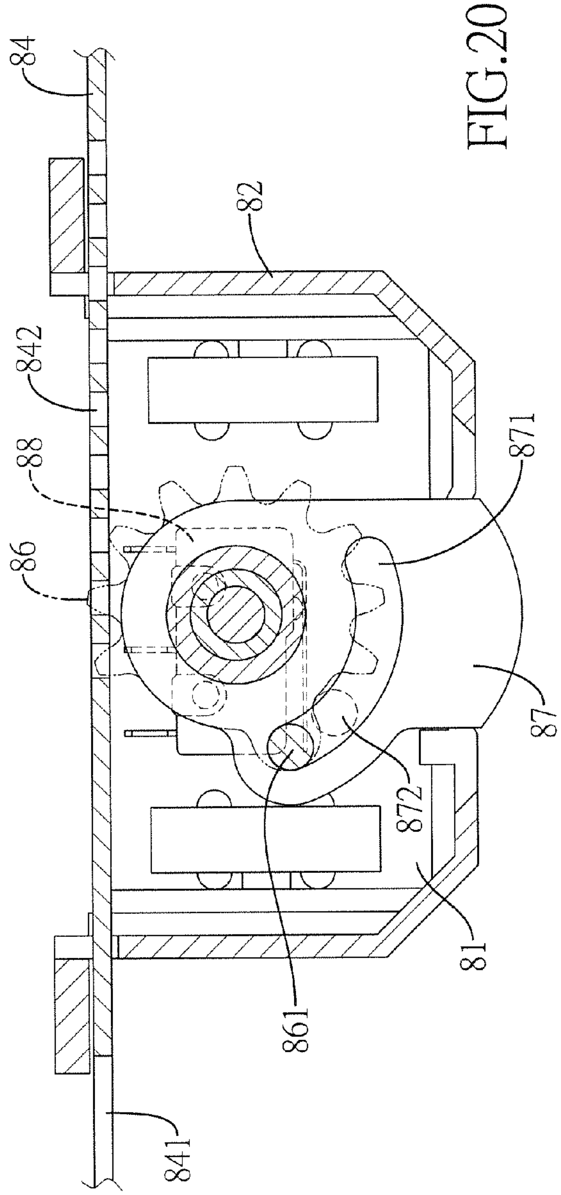
FIG. 20 is an enlarged cross-sectional top view of the lock mechanism in FIG. 14, showing the lock mechanism is locked.
Figure 21:
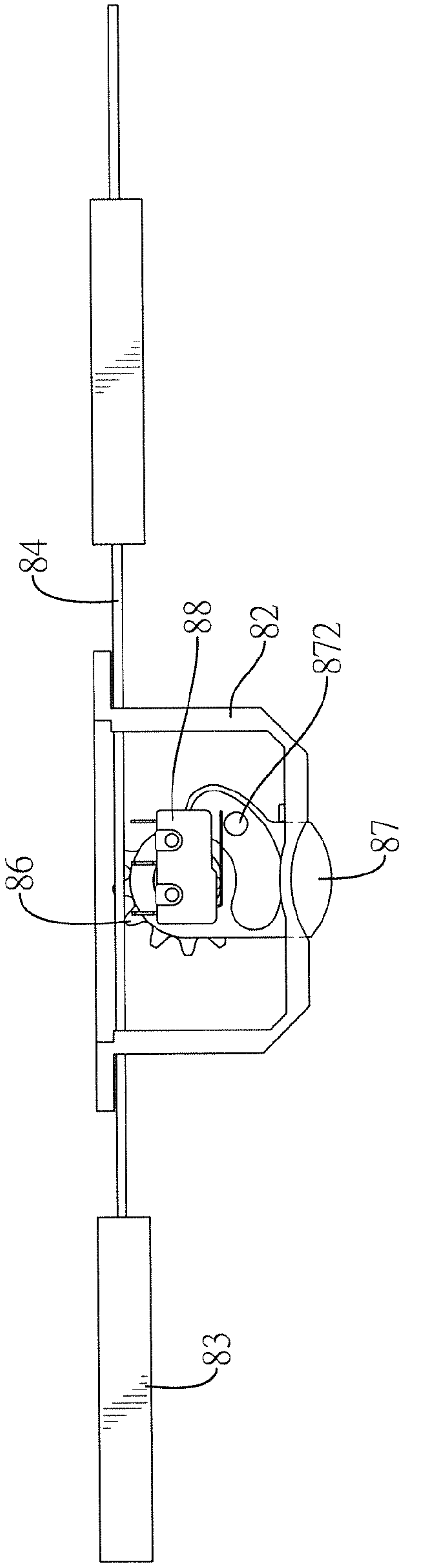
FIG. 21 is a bottom view of the lock mechanism in FIG. 14, wherein a micro switch seat and two motor connectors of the lock mechanism are omitted.

With further reference to FIGS. 14 to 16, the lock mechanism 80 is mounted on the motor cover 40 and has a mounting shell, two indication plate stoppers 83, a driving mechanism 84, a lock 85, a sprocket 86, an indication plate 87, and a micro switch 88.

The mounting shell is mounted on the motor cover 40. The indication plate stoppers 83 are oppositely disposed beside the mounting shell and respectively correspond in position to the main input indication plate 52 and the auxiliary input indication plate. Each of the indication plate stoppers 83 has a mounting hole 831. The driving mechanism 84 is slidably mounted through the mounting shell and the indication plate stoppers 83 and has two through holes 841 selectively corresponding in position to the mounting holes 831 of the indication plate stoppers 83 respectively.

The lock 85 is mounted on the mounting shell and has a keyhole 851. The sprocket 86 is securely mounted on and is driven to rotate by the lock 85, is connected to the driving mechanism 84, and drives the driving mechanism 84 to slide. The sprocket 86 has a driving protrusion 861 protruding from a side surface of the sprocket 86. The indication plate 87 is mounted around the lock 85, is connected to and is driven to rotate by the sprocket 86, and selectively protrudes out of the mounting shell. The indication plate 87 has a guiding slot 871 and a triggering protrusion 872. The driving protrusion 861 of the sprocket 86 is mounted through the guiding slot 871. The micro switch 88 of the lock mechanism 80 is mounted in the mounting shell and is selectively triggered by the triggering protrusion 872 of the indication plate 87.

Specifically, the driving mechanism 84 is an elongated metal panel and further has multiple engaging holes 842. The through holes 841 of the driving mechanism 84 are separately formed through the elongated metal panel. The engaging holes 842 are separately formed through the elongated metal panel and are transversely arranged between the through holes 841 of the driving mechanism 84. The sprocket 86 has multiple teeth. Some of the teeth of the sprocket 86 respectively engage in some of the engaging holes 842 of the elongated metal panel. Thus, as the sprocket 86 is rotated, the sprocket 86 drives the elongated metal panel to slide transversely.

Specifically, the mounting shell of the lock mechanism 80 is formed by attaching a micro switch mount 81 and a lock mount 82. The lock mount 82 is mounted on the micro switch mount 81. The lock 85 is mounted on the lock mount 82. The micro switch 88 of the lock mechanism 80 is mounted on the switch mount 81. The lock mechanism 80 further has two motor leads 89. The motor leads 89 are mounted on the micro switch mount 81 and are oppositely disposed beside the micro switch 88 of the lock mechanism 80.

With reference to FIGS. 12 and 13, the switching handle 51 can be turned to use electrical power that is provided by a main power source. When the switching handle 51 is turned to drive the main function slider 57 to slide forward via the gear set 54, the main function slider 57 sequentially drives the main switch handle 21 and the main moving element 22 to allow the main moving element 22 of the main no-fuse circuit breaker 20 to form electrical conduction.

Figure 11:
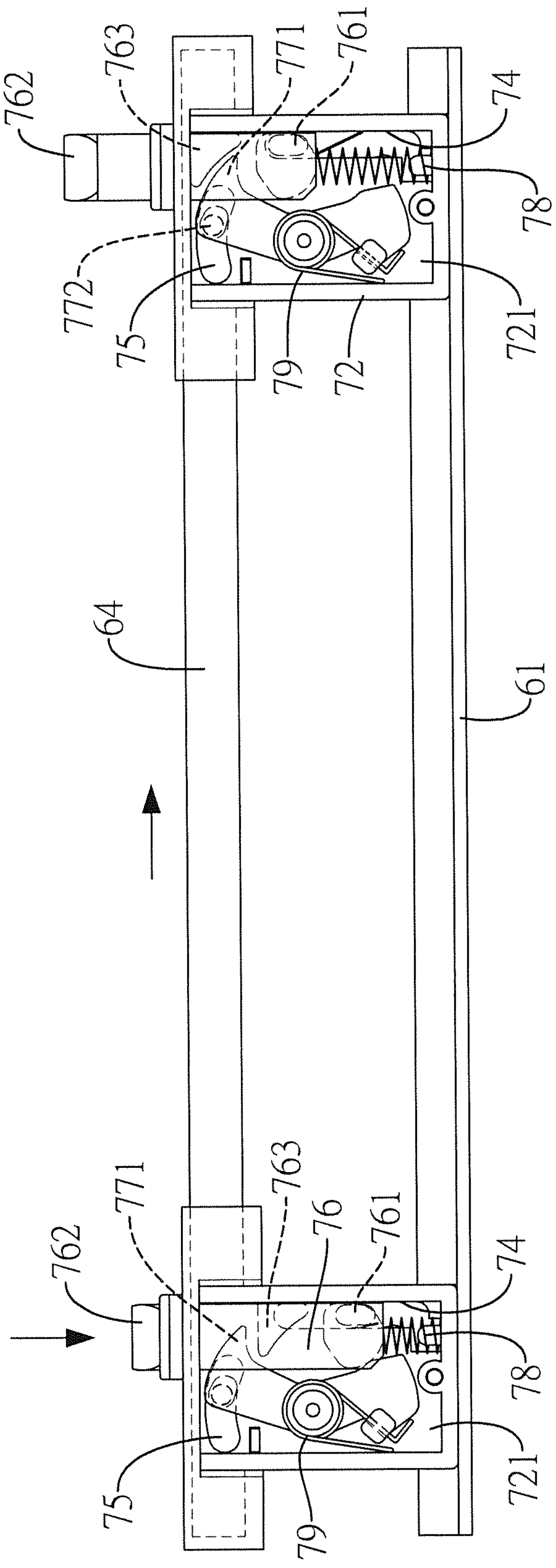
FIG. 11 is an operational rear view of the transmission mechanism in FIG. 3, wherein the side cover is omitted.

With further reference to FIGS. 6 and 11, meanwhile, the main moving element 22 presses against the transmission bar 76 of the main transmission set 62, and the transmission bar 76 of the main transmission set 62 slides downwardly. Accordingly, the transmission bar 76 of the main transmission set 62 drives the rotating element 77 of the main transmission set 62 to rotate counterclockwise, and the transmission rod 64 slides leftward and drives the rotating element 77 of the auxiliary transmission set 63 to rotate counterclockwise. When the rotating element 77 of the auxiliary transmission set 63 abuts the lower end of the main bar 765 of the transmission bar 76 of the auxiliary transmission set 63, the transmission bar 76 of the auxiliary transmission set 63 cannot slide downward to form electrical conduction of the auxiliary no-fuse circuit breaker 30.

Figure 7:
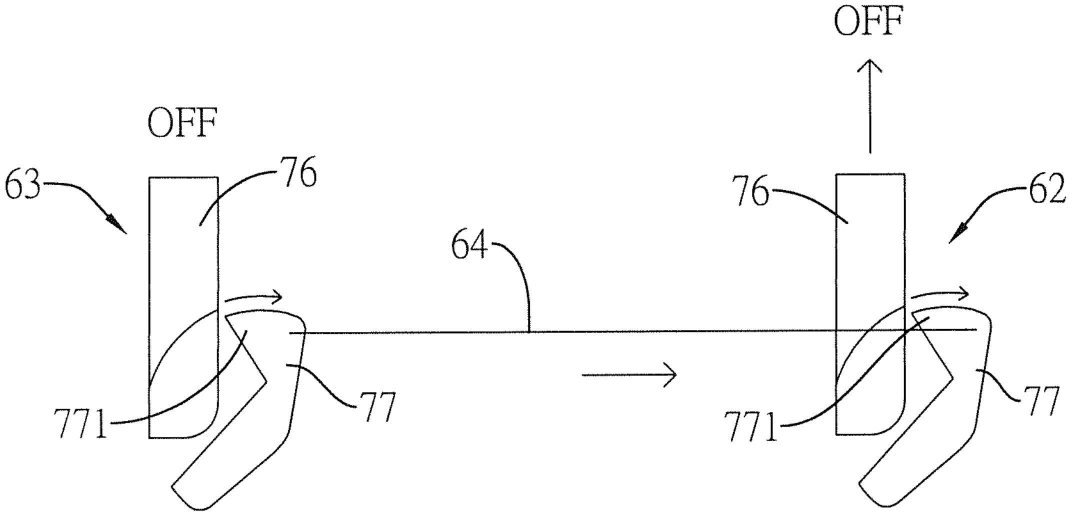
FIG. 7 is an operational schematic view of the transmission mechanism in FIG. 3 when an electrical conduction of the main no-fuse circuit breaker is open.

With further reference to FIG. 7, when the switching handle 51 is turned reversely to interrupt the electrical conduction of the main no-fuse circuit breaker 20 and to release the transmission bar 76 of the main transmission set 62, the first resilient element 78 of the main transmission set 62 pushes the transmission bar 76 of the main transmission set 62 to slide upward. Accordingly, the second resilient elements 79 of the main transmission set 62 and the auxiliary transmission set 63 push the rotating elements 77 of the main transmission set 62 and the auxiliary transmission set 63 to rotate clockwise. Thus, the engaging protrusions 771 of the rotating elements 77 depart from the transmission bars 76. The first resilient element 78 of the auxiliary transmission set 63 pushes the transmission bar 76 of the auxiliary transmission set 63 to slide upward.

Figure 8:
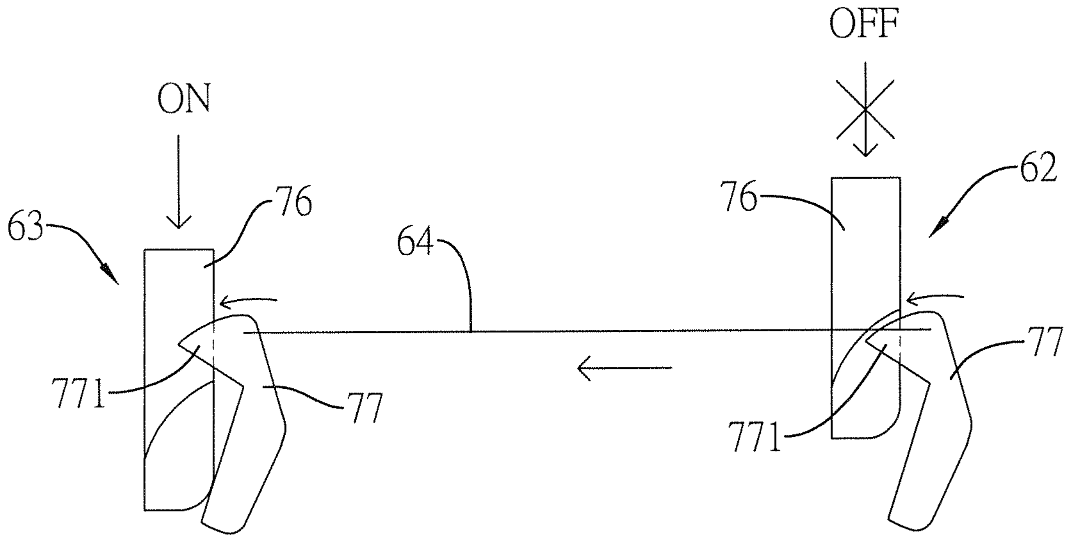
FIG. 8 is an operational schematic view of the transmission mechanism in FIG. 3 when an electrical conduction of an auxiliary no-fuse circuit breaker is closed.
Figure 9:
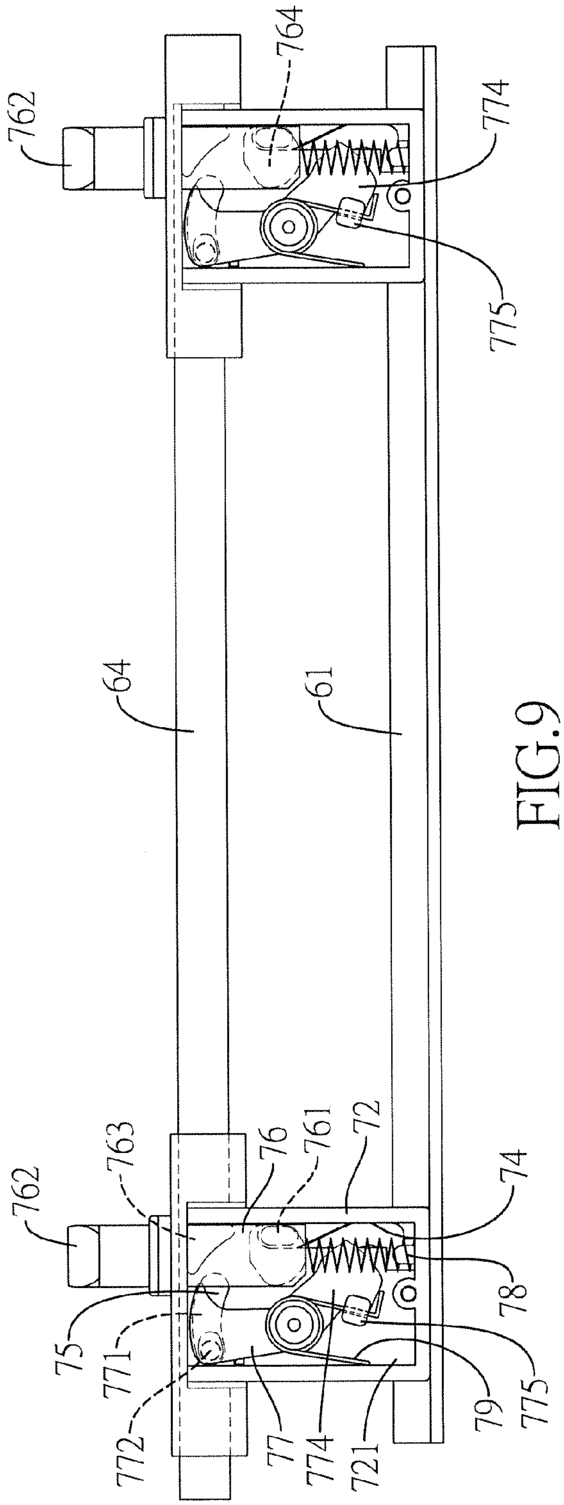
FIG. 9 is a rear view of the transmission mechanism in FIG. 3, wherein a side cover is omitted.
Figure 10:
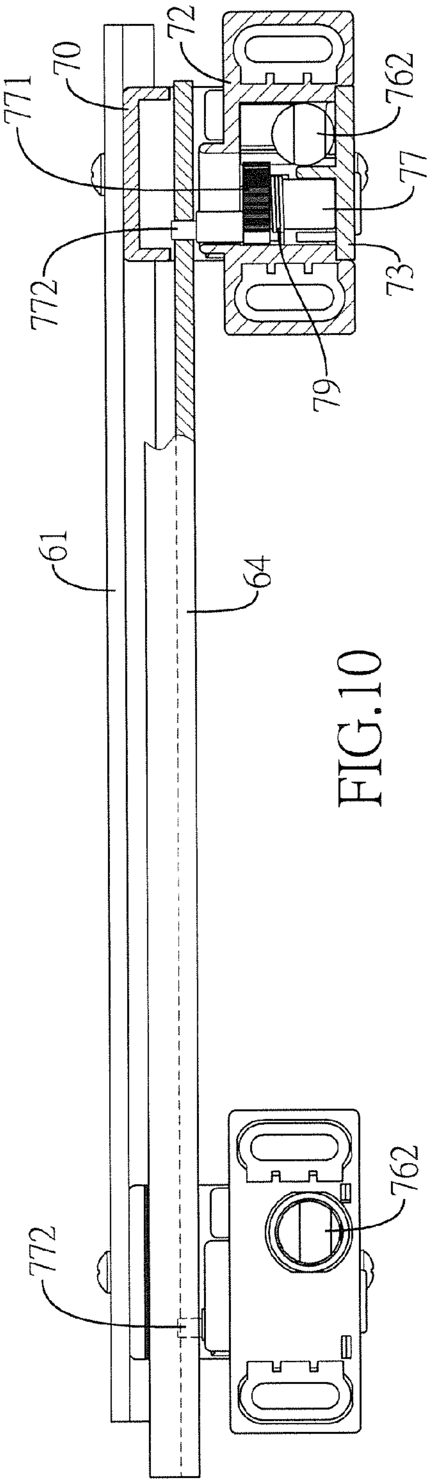
FIG. 10 is a top view in partial section of the transmission mechanism in FIG. 3.

With further reference to FIG. 8, furthermore, the switching handle 51 can be turned to use electrical power that is provided by an auxiliary power source. When the switching handle 51 is turned to allow the auxiliary no-fuse circuit breaker 30 to form the electrical conduction and to allow the auxiliary moving element to press against the transmission bar 76 of the auxiliary transmission set 63, the main transmission set 62 is driven by the auxiliary transmission set 63, such that the transmission bar 76 of the main transmission set 62 cannot slide downward to form the electrical conduction of the main no-fuse circuit breaker 20.

Moreover, as the switching handle 51 of the switching control assembly 50 drives the main function slider 57 or the auxiliary function slider to slide forward via the gear set 54, the main input indication plate 52 attached to the main function slider 57 and the auxiliary input indication plate attached to the auxiliary function slider protrude out of the motor cover 40 selectively. Thus, operators can determine whether the main power source or the auxiliary power source is providing the electrical power according to the input indication plate that is protruding out of the motor cover 40.

With further reference to FIGS. 16 to 18 and 22, when the lock 85 of the lock mechanism 80 is unlocked, the through holes 841 of the driving mechanism 84 respectively align with the mounting holes 831 of the indication plate stoppers 83. Thus, the main input indication plate 52 and the auxiliary input indication plate can further protrude through the through holes 841 of the driving mechanism 84 and the mounting holes 831 of the indication plate stoppers 83. Moreover, the triggering protrusion 872 of the indication plate 87 does not trigger the micro switch 88 of the lock mechanism 80.

With further reference to FIGS. 19 to 21 and 23, for the safety of the operators, a key can be inserted into the keyhole 851 of the lock 85 to turn and lock the lock 85. When the lock 85 is turned, the sprocket 86 is turned accordingly. The driving mechanism 84 is driven to slide by the sprocket 86, such the through holes 841 of the driving mechanism 84 misalign with the mounting holes 831 of the indication plate stoppers 83. Thus, the main input indication plate 52 and the auxiliary input indication plate cannot protrude through the mounting holes 831 of the indication plate stoppers 83. Therefore, the switching control assembly 50 cannot be switched. Moreover, as the sprocket 86 is turned, the driving protrusion 861 of the sprocket 86 slides along the guiding slot 871 of the indication plate 87 to drive the indication plate 87 to rotate and to allow the indication plate 87 to protrude out of the mounting shell. When the indication plate 87 protrudes out of the mounting shell, the operators can determine that the lock mechanism 80 is locked. Furthermore, as the indication plate 87 is turned, the triggering protrusion 872 of the indication plate 87 triggers the micro switch 88 of the lock mechanism 80.

The transfer switch as described as described has the following advantages. The transmission mechanism 60 improves safety of switching between the main power source and the auxiliary power source. The lock mechanism 80 can further be locked to stop operation of the transmission mechanism 60 for the safety of the operator.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A transfer switch comprising:
a mounting seat;
a main no-fuse circuit breaker mounted on the mounting seat and having a main moving element;
an auxiliary no-fuse circuit breaker mounted on the mounting seat and having an auxiliary moving element;
a switching control assembly connected and selectively switching the main no-fuse circuit breaker and the auxiliary no-fuse circuit breaker; and
a transmission mechanism mounted on a bottom of the mounting seat and having
a main transmission set corresponding in position to the main moving element of the main no-fuse circuit breaker;
an auxiliary transmission set disposed apart from the main transmission set and corresponding in position to the auxiliary moving element of the auxiliary no-fuse circuit breaker; and
a transmission rod connected to and being slidable relative to the main transmission set and the auxiliary transmission set;
wherein each of the main transmission set and the auxiliary transmission set has a rotating element and a transmission bar, the transmission bar is driven by a corresponding one of the main moving element and the auxiliary moving element, selectively slides up and down and drives the rotating element to rotate; and
the transmission rod has two ends respectively connected to the rotating elements of the main transmission set and the auxiliary transmission set.

2. The transfer switch as claimed in claim 1, wherein
each of the main transmission set and the auxiliary transmission set has a housing;
the rotating element and the transmission bar of each of the main transmission set and the auxiliary transmission set are mounted in the housing.

3. The transfer switch as claimed in claim 2, wherein
the housing of each of the main transmission set and the auxiliary transmission set has
a through hole formed through an upper wall of the housing;
two pivot holes respectively formed through a front wall and a rear wall of the housing, and aligning with each other; and
a transverse slot formed through the front wall of the housing;
the transmission bar of each of the main transmission set and the auxiliary transmission set has
a main bar having an upper end protruding through the through hole of the housing;
a pushing protrusion protruding from a side surface of the main bar; and
a stop protrusion protruding from the side surface of the main bar and disposed above the pushing protrusion;
the rotating element of each of the main transmission set and the auxiliary transmission set has
a pivot shaft having two ends respectively mounted pivotally in the pivot holes of the housing;
an engaging protrusion protruding up from the pivot shaft and selectively abutting a lower end of the stop protrusion of the transmission bar;
a guiding shaft protruding from the engaging protrusion, mounted through the transverse slot of the housing, and connected to the transmission rod;
a transmission protrusion protruding down from the pivot shaft, and disposed below and selectively pushed by the pushing protrusion of the transmission bar; and
a stop protrusion protruding from the transmission protrusion; and
each of the main transmission set and the auxiliary transmission set further has
a first resilient element mounted in the housing and having two ends respectively abutting a lower end of the main bar of the transmission bar and a lower wall of the housing; and
a second resilient element mounted in the housing and having two ends respectively abutting the stop protrusion of the rotating element and a side wall of the housing.

4. The transfer switch as claimed in claim 3, wherein the housing of each of the main transmission set and the auxiliary transmission set further has a longitudinal slot formed through the front wall of the housing; and the transmission bar of each of the main transmission set and the auxiliary transmission set further has a sliding shaft protruding from the pushing protrusion of the transmission bar and mounted through the longitudinal slot of the housing.

5. The transfer switch as claimed in claim 4, wherein each of the main transmission set and the auxiliary transmission set further has a micro switch case receiving a micro switch;

the housing of each of the main transmission set and the auxiliary transmission set is attached to the micro switch case and is formed by attaching a main case and a side cover, the main case has a front sidewall facing the micro switch case;

a rear opening covered with the side cover; and a mounting chamber formed in the main case;

the through hole of the housing is formed through an upper sidewall of the main case;

the pivot holes of the housing are respectively formed through the front sidewall of the main case and the side cover;

the transverse slot and the longitudinal slot of the housing are formed through the front sidewall of the main case;

the transmission bar and the rotating element of each of the main transmission set and the auxiliary transmission set are mounted in the mounting chamber of the main case;

the transmission bar of each of the main transmission set and the auxiliary transmission set further has an end cap mounted on the upper end of the main bar, protruding out of the housing, and selectively pushed by the corresponding one of the main moving element and the auxiliary moving element; and the sliding shaft of the rotating element of each of the main transmission set and the auxiliary transmission set protrudes into the micro switch case, and selectively triggers the micro switch in the micro switch case.

6. The transfer switch as claimed in claim 5, wherein the mounting seat has a base; and two side supports separately mounted on the base;

the transfer switch further comprises a motor cover mounted on the side supports and above the main no-fuse circuit breaker and the auxiliary no-fuse circuit breaker;

the switching control assembly is mounted on the motor cover and has a main input indication plate slidably mounted in and selectively protruding out of the motor cover, and corresponding in position to the main no-fuse circuit breaker; and an auxiliary input indication plate slidably mounted in and selectively protruding out of the motor cover, and corresponding in position to the auxiliary no-fuse circuit breaker; and the transfer switch further has a lock mechanism mounted on the motor cover and having a mounting shell mounted on the motor cover;

two indication plate stoppers oppositely disposed beside the mounting shell and respectively corresponding in position to the main input indication plate and the auxiliary input indication plate, each of the indication plate stoppers has a mounting hole;

a driving mechanism slidably mounted through the mounting shell and the indication plate stoppers and having two through holes selectively corresponding in position to the mounting holes of the indication plate stoppers respectively;

a lock mounted on the mounting shell and having a keyhole;

a sprocket securely mounted on and driven to rotate by the lock, connected to the driving mechanism, and driving the driving mechanism to slide, the sprocket having a driving protrusion protruding from a side surface of the sprocket;

an indication plate mounted around the lock, connected to and driven to rotate by the sprocket, and selectively protruding out of the mounting shell, the indication plate having a guiding slot for the driving protrusion of the sprocket to be mounted through the guiding slot; and a triggering protrusion; and a micro switch mounted in the mounting shell and selectively triggered by the triggering protrusion of the indication plate.

7. The transfer switch as claimed in claim 6, wherein the mounting shell of the lock mechanism is formed by attaching a micro switch mount and a lock mount, the lock mount is mounted on the micro switch mount;

the lock is mounted on the lock mount;

the micro switch of the lock mechanism is mounted on the switch mount; and the lock mechanism further has two motor leads mounted on the micro switch mount and oppositely disposed beside the micro switch of the lock mechanism.

8. The transfer switch as claimed in claim 7, wherein the switching control assembly further has a main function slider attached to the main input indication plate, and mounted above and selectively driving the main no-fuse circuit breaker; and an auxiliary function slider attached to the auxiliary input indication plate, and mounted above and selectively driving the auxiliary no-fuse circuit breaker.

9. The transfer switch as claimed in claim 8, wherein the switching control assembly further has a switching handle mounted on the motor cover; and a gear set connected to the switching handle; and the main function slider and the auxiliary function slider of the switching control assembly are driven by the gear set.

10. The transfer switch as claimed in claim 9, wherein the first resilient element of each of the main transmission set and the auxiliary transmission set is a compression spring; and the second resilient element of each of the main transmission set and the auxiliary transmission set is a torsion spring mounted around the pivot shaft of the rotating element.

* * * * *